United States Patent
Bhattacharya

(10) Patent No.: US 8,897,140 B1
(45) Date of Patent: Nov. 25, 2014

(54) CONGESTION MANAGED TRAFFIC ENGINEERING SERVICES IN MULTIPROTOCOL LABEL SWITCHING AND GENERALIZED MULTIPROTOCOL LABEL SWITCHING NETWORKS

(71) Applicant: Ciena Corporation, Hanover, MD (US)

(72) Inventor: Somen Bhattacharya, Santa Clara, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/047,484

(22) Filed: Oct. 7, 2013

(51) Int. Cl.
  *H04L 1/00* (2006.01)
  *H04L 12/803* (2013.01)
(52) U.S. Cl.
  CPC .................................. *H04L 47/122* (2013.01)
  USPC ......................................................... 370/237
(58) Field of Classification Search
  CPC combination set(s) only.
  See application file for complete search history.

(56) References Cited

U.S. PATENT DOCUMENTS

| | | | |
|---|---|---|---|
| 2006/0067213 A1* | 3/2006 | Evans et al. ................... | 370/229 |
| 2011/0044173 A1* | 2/2011 | Kakadia et al. ............... | 370/238 |
| 2012/0250515 A1* | 10/2012 | Kakadia et al. ............... | 370/237 |
| 2012/0257499 A1* | 10/2012 | Chatterjee et al. ............ | 370/232 |

* cited by examiner

*Primary Examiner* — Clemence Han
(74) *Attorney, Agent, or Firm* — Muncy, Geissler, Olds & Lowe, P.C.

(57) ABSTRACT

Methods and apparatus for mitigating congestion by using advanced traffic engineering services in a multiprotocol label switching (MPLS) network and/or a generalized multiprotocol label switching (GMPLS) network are provided. In an example, provided is a method for mitigating congestion in an MPLS network. The method includes monitoring, at a network element, a traffic drop count due to traffic queue overflow on at least one of a traffic queue coupled to a link and a network interface coupled to the link. Then the traffic drop count is converted to a normalized congestion indicator for the at least one of the traffic queue and the network interface. Further, based on the normalized congestion indicator, optimize a route of a label switched path in the MPLS network so the route avoids the link. The provided methods and apparatus advantageously improve throughput, reliability, and availability of traffic engineered MPLS and GMPLS transport services.

20 Claims, 6 Drawing Sheets

CONGESTION MANAGED TRAFFIC ENGINEERING SERVICES IN MULTIPROTOCOL LABEL SWITCHING AND GENERALIZED MULTIPROTOCOL LABEL SWITCHING NETWORKS

FIELD OF DISCLOSURE

This disclosure relates generally to electronics, and more specifically, but not exclusively, to methods and apparatus that mitigate congestion by using advanced traffic engineering services in a multiprotocol label switching (MPLS) network and/or a generalized multiprotocol label switching (GMPLS) network.

BACKGROUND

During constrained path calculation or path re-optimization processes, conventional MPLS- and GMPLS-based traffic engineered transport services use link bandwidth, service expenses, and delay/jitter as traffic engineering (TE) link metrics. However, congestion status of traffic queues in the data plane is not conventionally considered a TE link metric and is not used for constrained path calculation of traffic engineered label switched paths (TE-LSPs). Thus, the impact of congestion in data plane traffic queues is not considered in evaluating the performance, reliability, and availability of transport LSP services in MPLS and GMPLS traffic engineered networks.

However TE links along the LSP's path may sometimes be congested due to faulty hardware and/or software components; due to a denial of service (DOS) attack; and/or due to a transient failure in the network. An LSP re-route over alternate paths and a local repair via protection switching considers link or node failures, however, sometimes traffic congestion through switches in the network occurs when there is no link or node failure (e.g., too much data and not enough transport capacity). Thus, because congestion status of traffic queues is not conventionally considered a TE link metric, no LSP rerouting or local repair occurs on the congested link, causing severe traffic loss.

Accordingly, there are long-felt industry needs for methods and apparatus that improve upon conventional methods and apparatus, including methods and apparatus that mitigate congestion by using advanced traffic engineering services in a MPLS network and/or a GMPLS network.

SUMMARY

This summary provides a basic understanding of some aspects of the present teachings. This summary is not exhaustive in detail, and is neither intended to identify all critical features, nor intended to limit the scope of the claims.

Exemplary methods and apparatus for mitigating congestion in a multi protocol label switching (MPLS) network are provided. For example, a provided method includes monitoring, at a network element, a traffic drop count due to traffic queue overflow on at least one of a traffic queue coupled to a link and a network interface coupled to the link. The method converts the traffic drop count to a normalized congestion indicator for the at least one of the traffic queue and the network interface and optimizes, based on the normalized congestion indicator, a route of a label switched path in the MPLS network so the route avoids the link. The optimizing can include rerouting the route using a resource reservation protocol make-before-break procedure or a generalized multiprotocol label switching resource reservation protocol tunnel rerouting. The method can also include estimating a time delay required to drain the queued traffic, based on an average queue length and a packet scheduling rate and advertising the time delay to a second network element with a type length value element.

The method can also include advertising the normalized congestion indicator to a second network element with a type length value element, and can include configuring, at the second network element, a point of local repair node to monitor a service quality of the label switched path by checking for the advertised normalized congestion indicator, comparing the advertised normalized congestion indicator to a threshold value, and triggering, if the advertised normalized congestion indicator degrades beyond the threshold value, a protection switchover of the label switched path to a back-up route.

In a further example, provided is a non-transitory computer-readable medium, comprising instructions stored thereon that, if executed by a processor, such as a special-purpose processor, cause the processor to execute at least a part of the aforementioned method. The non-transitory computer-readable medium can be integrated with and/or in a device, such as an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, an aggregation platform extension device, and/or a network element configured to change Operations, Administration, and Maintenance (OAM) attributes.

In another example, provided is an apparatus configured to mitigate congestion in a multi protocol label switching (MPLS) network. The apparatus includes means for monitoring, at a network element, a traffic drop count due to traffic queue overflow on at least one of a traffic queue coupled to a link and a network interface coupled to the link, as well as means for converting the traffic drop count to a normalized congestion indicator for the at least one of the traffic queue and the network interface. The apparatus also includes means for optimizing, based on the normalized congestion indicator, a route of a label switched path in the MPLS network so the route avoids the link. The means for optimizing can include means for rerouting the route using a resource reservation protocol make-before-break procedure or a generalized multiprotocol label switching resource reservation protocol tunnel rerouting.

The apparatus can also include means for advertising the normalized congestion indicator to a second network element with a type length value element. The apparatus can also include means for estimating a time delay required to drain the queued traffic, based on an average queue length and a packet scheduling rate, as well as means for advertising the time delay to a second network element with a type length value element.

At least a part of the apparatus can be integrated in a semiconductor die. Further, at least a part of the apparatus can be integrated with and/or in a device, such as an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, an aggregation platform extension device, and/or a network element configured to change Operations, Administration, and Maintenance (OAM) attributes. In a further example, provided is a non-transitory computer-readable medium, comprising instructions stored thereon that, if executed by a lithographic device, cause the lithographic device to fabricate at least a part of the apparatus.

In another example, provided is an apparatus configured to mitigate congestion in a multi protocol label switching (MPLS) network, including a processor configured to monitor, at a network element, a traffic drop count due to traffic queue overflow on at least one of a traffic queue coupled to a link and a network interface coupled to the link, as well as to convert the traffic drop count to a normalized congestion indicator for the at least one of the traffic queue and the network interface The processor is also configured to optimize, based on the normalized congestion indicator, a route of a label switched path in the MPLS network so the route avoids the link. The optimizing can also include rerouting the route using a resource reservation protocol make-before-break procedure or a generalized multiprotocol label switching resource reservation protocol tunnel rerouting.

The processor can also be configured to advertise the normalized congestion indicator to a second network element with a type length value element. In another example, the processor is further configured to estimate, approximately calculate, and/or calculate a time delay required to drain the queued traffic, based on an average queue length and a packet scheduling rate, as well as to advertise the time delay to a second network element with a type length value element.

At least a part of the apparatus can be integrated on a semiconductor die. Further, at least a part of the apparatus can be integrated with a device, such as an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, an aggregation platform extension device, and/or a network element configured to change Operations, Administration, and Maintenance (OAM) attributes. In a further example, provided is a non-transitory computer-readable medium, comprising instructions stored thereon that, if executed by a lithographic device, cause the lithographic device to fabricate at least a part of the apparatus.

The foregoing broadly outlines some of the features and technical advantages of the present teachings in order that the detailed description and drawings can be better understood. Additional features and advantages are also described in the detailed description. The conception and disclosed embodiments can be readily utilized as a basis for modifying or designing other structures for carrying out the same purposes of the present teachings. Such equivalent constructions do not depart from the technology of the teachings as set forth in the claims. The novel features that are characteristic of the teachings, together with further objects and advantages, are better understood from the detailed description and the accompanying figures. Each of the figures is provided for the purpose of illustration and description only, and does not limit the present teachings.

BRIEF DESCRIPTION OF THE DRAWINGS

The accompanying drawings are presented to describe examples of the present teachings, and are not limiting.

Figure 1:
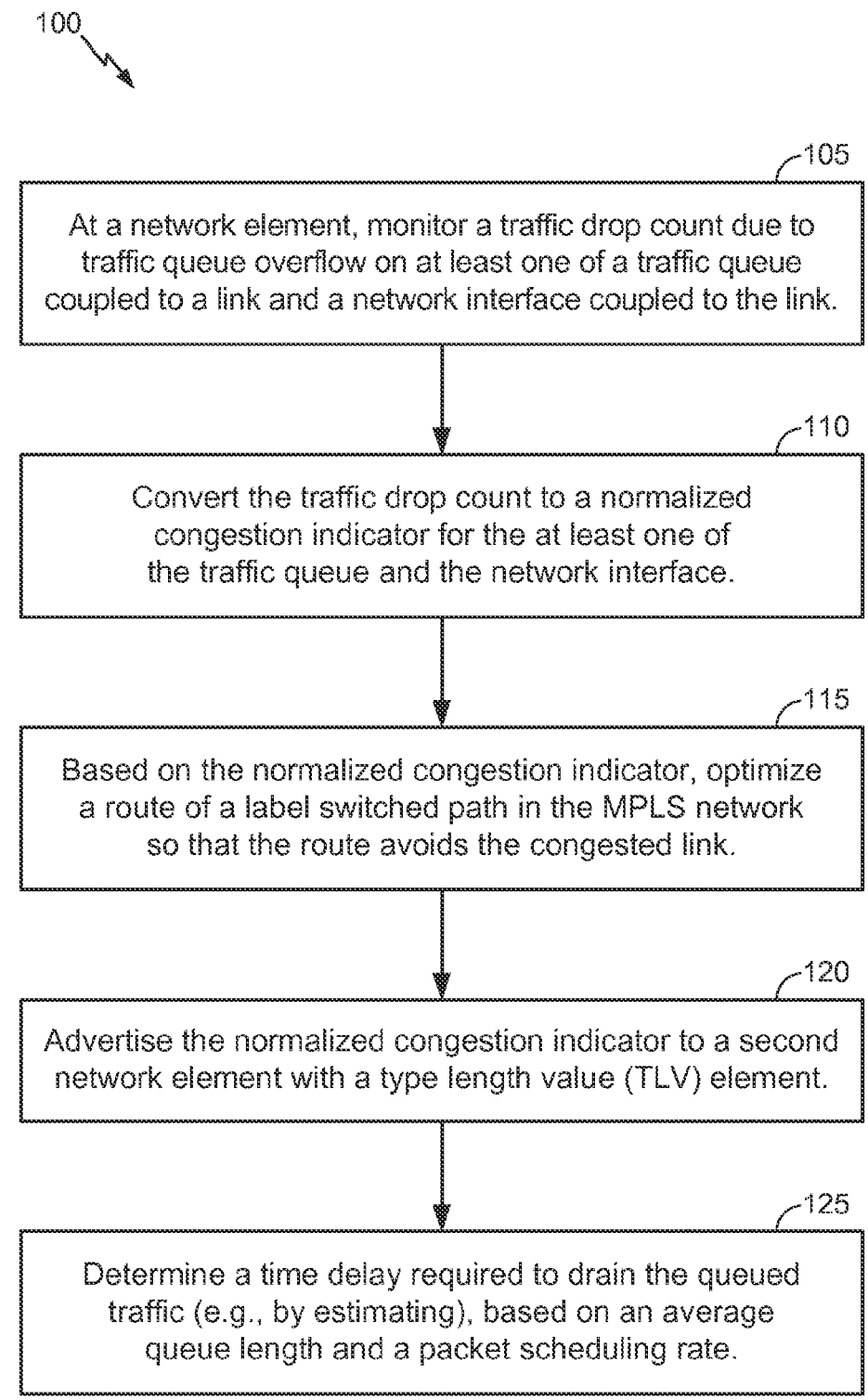
FIG. 1 depicts an exemplary method for mitigating congestion in an MPLS and/or GMPLS network.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Introduction

Methods and apparatus for mitigating congestion by using advanced traffic engineering services in a multiprotocol label switching (MPLS) network and/or a generalized multiprotocol label switching (GMPLS) network are provided. Provided are methods and apparatus that provide a mechanism to monitor a congestion status of traffic engineering (TE) capable links and to propagate the congestion information across an interior gateway protocol-traffic engineering (IGP-TE) network.

In an example, provided is a method for mitigating congestion in an MPLS network. The method includes monitoring, at a network element, a traffic drop count due to traffic queue overflow on at least one of a traffic queue coupled to a link and a network interface coupled to the link. Then, the traffic drop count is converted to a normalized congestion indicator for the at least one of the traffic queue and the network interface. Further, based on the normalized congestion indicator, a route of a label switched path in the MPLS network is optimized so the route avoids the link.

The exemplary apparatuses and methods disclosed herein advantageously address the long-felt industry needs, as well as other previously unidentified needs, and mitigate shortcomings of the conventional methods and apparatus. For example, an advantage provided by the disclosed apparatuses and methods herein is an improvement in throughput, reliability, and availability of traffic engineered MPLS and GMPLS transport services over conventional devices. Another advantage is that the provided methods and apparatuses extend the traffic engineering services supported by Internet Engineering Task Force (IETF) standards OSPFv2-TE (RFC 3630), OSPFv3-TE (RFC 5329), IS-IS-TE (RFC 5305), GMPLS-OSPF-TE (RFC 4203), and GMPLS-ISIS-TE (RFC 5307) (the content of each are incorporated by reference herein in their entireties). The provided methods and apparatuses also extend existing OSPF-TE, ISIS-TE, GMPLS-OSPF-TE and GMPLS-ISIS-TE protocol operations with optional link attribute TLV(s) without causing inter-operability issues, since the new link attribute TLVs are exchanged between two consenting OSPF or IS-IS neighbors.

A further advantage is that the provided methods and apparatuses do not add additional scaling or performance overhead as the protocol exchange runs on-demand only during congestion status changes of traffic queues. Also, the provided methods and apparatuses do not impose any additional security threats other than those already applicable for OSPF-TE, ISIS-TE, GMPLS-OSPF-TE, and GMPLS-ISIS-TE.

Exemplary embodiments are disclosed in this application's text and drawings. Alternate embodiments can be devised without departing from the scope of the invention. Additionally, conventional elements of the current teachings may not be described in detail, or may be omitted, to avoid obscuring aspects of the current teachings.

As used herein, the term "exemplary" means "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted that the terms "connected," "coupled," or any variant thereof, mean any connection or coupling, either direct or indirect, between elements, and can encompass a presence of an intermediate element between two elements that are "connected" or "coupled" together via the intermediate element. Coupling and/or connection between the elements can be physical, logical, or a combination thereof. As employed herein, elements can be "connected" or "coupled" together, for example, by using one or more wires, cables, and/or printed electrical connections, as well as by using electromagnetic energy. The electromagnetic energy can have wavelengths in the radio frequency region, the microwave region and/or the optical (both visible and invisible) region. These are several non-limiting and non-exhaustive examples.

It should be understood that the term "signal" can include any signal such as a data signal, audio signal, video signal, multimedia signal, analog signal, and/or digital signal. Information and signals can be represented using any of a variety of different technologies and techniques. For example, data, an instruction, a process step, a command, information, a signal, a bit, and/or a symbol described in this description can be represented by a voltage, a current, an electromagnetic wave, a magnetic field and/or particle, an optical field and/or particle, and any combination thereof.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements."

The terminology used herein is for the purpose of describing particular embodiments only and is not intended to be limiting. As used herein, the singular forms "a," "an," and "the" are intended to include the plural forms as well, unless the context clearly indicates otherwise. Further, the terms "comprises," "comprising," "includes," and "including," when used herein, specify a presence of stated features, integers, steps, operations, elements, and/or components, but do not preclude the presence and/or addition of one or more other features, integers, steps, operations, elements, components, and/or groups thereof.

The following acronyms may be used herein:
ARMA=Auto Regressive Moving Average
CE=customer edge
CMCD=Congestion Management Capability Descriptor
CSPF=constrained shortest path first
DOS=denial of service (e.g., a denial of service attack)
ER=edge router
EWMA=Exponential Weighted Moving Average
GMPLS=generalized multiprotocol label switching
IETF=internet engineering task force
IGP-TE=interior gateway protocol-traffic engineering
IP=internet protocol
IS-IS=Intermediate System to Intermediate System
ISIS-TE=intermediate system to intermediate system-traffic engineering
LCF=Link Level Congestion Factor
LDP=label distribution protocol
LSA=Link State Advertisement
LSP=label switched path or Link State Packet
L2=layer two
L3=layer three
MPLS=multi protocol label switching
NCF=Node Level Congestion Factor
NE=network element
NMS=network management system
OAM&P=operations, administration, maintenance, and provisioning
OSPF=Open Shortest Path First
OSPF-TE=open shortest path first-traffic engineering
OTN=optical transport network
PCE=path computation element
PE=provider edge
PLCI=Percentage Link Level Congestion Indicator
PLR=point of local repair
PNCI=Percentage Node Level Congestion Indicator
PQCI=Percentage Queue Level Congestion Indicator
PSN=packet switched network
QCF=Queue Level Congestion Factor
QoS=quality of service
RFC=request for comment
RSVP-TE=resource reservation protocol-traffic engineering
SDH=synchronous digital hierarchy
SONET=synchronous optical network
TE=traffic engineering
TE-LSA=traffic engineering-link state advertisement
TE-LSDB=traffic engineering-link state database(s)
TLV=type length value
VPN=virtual private network The term "traffic engineering" (TE) describes: mapping data traffic flows through a physical topology of a data network to optimize performance; mapping data traffic flows in a manner to efficiently use data network bandwidth; rerouting traffic in response to a single failure or multiple failures; and/or controlling a path by which a packet travels to maximize data traffic throughput through the data network. The apparatus and methods described herein enable a network operator performing TE to move data traffic flow away from a shortest path to a potentially less congested physical path in the data network.

The following documents are incorporated by reference herein in their entireties: IETF RFC3945—Generalized Multi-Protocol Label Switching (GMPLS) Architecture; IETF RFC4202—Routing Extensions in Support of Generalized Multi-Protocol Label Switching (GMPLS); IETF RFC4203—OSPF Extensions in Support of Generalized Multi-Protocol Label Switching (GMPLS); IETF RFC5305—IS-IS Extensions for Traffic Engineering; and IETF RFC5307—IS-IS Extensions in Support of Generalized Multi-Protocol Label Switching (GMPLS).

DESCRIPTION OF THE FIGURES

FIG. 1 depicts an exemplary method 100 for mitigating congestion in a multi protocol label switching (MPLS) network. The method 100 can be performed by the apparatus described hereby, such as the apparatus depicted in FIGS. 2-5. The method 100 enables TE networks react and respond to traffic congestion and to protect the customer and service provider's transport services from congestion-based collapse. The method 100 enables the TE networks to monitor congestion status in real time and to localize impact by re-routing customer services through an alternate and stable portion of the network. The method 100 can be used to protect transport layer MPLS/GMPLS label switched paths (LSPs), level 2 virtual private network (L2-VPN) services, and/or level 3 virtual private network (L3-VPN) services carried over label distribution protocol (LDP)-signaled pseudo-wires.

Switches such as MPLS and GMPLS switches have a data-plane that is typically de-coupled from a control-plane. However, in the method 100, the control plane proactively monitors for a data traffic drop due to traffic queue overflow for each priority level queue on network interfaces in the data plane of the switches. Monitoring is enhanced by the traffic queues in the data plane being configured with maximum thresholds for traffic drops, as well as data plane support for color-aware drop thresholds in traffic queues. Thus, the method 100 uses the control plane to translate monitored traffic drop counts on a per traffic queue and per network interface, to a normalized congestion indicator.

In step 105, at a network element, a traffic drop count due to traffic queue overflow is monitored on at least one of a traffic queue coupled to a link and a network interface coupled to the link.

In step 110, the traffic drop count is converted to a normalized congestion indicator for the at least one of the traffic queue and the network interface. In an example, when the normalized congestion indicator parameter value is zero, the corresponding link in the network is considered not congested.

In step 115, based on the normalized congestion indicator, a route of a label switched path in the MPLS network is optimized so that the route avoids the congested link. When there is a contention in TE network resources, a less congested end-to-end path can be considered more optimal than a more congested end-to-end path through the network. Head-end TE routers can re-optimize and re-route an existing MPLS and/or GMPLS LSP away from the congested TE link, based on a TE policy when there is a TE network resource re-optimization or a TE LSP's path re-optimization policy in effect.

To compare two congested path(s), the normalized congestion indicator parameter values can be compared to determine which path is more congested than the other. For new MPLS and/or GMPLS label switched path setup requests, the TE router at head-end computes an LSP path that avoids the congested TE link by considering the normalized congestion indicator as an additional path constraint. Alternately, a PCE-based distributed path computation server/client network can also collect the congestion information of the TE networks and use the normalized congestion indicator as a path constraint for an LSP. In the case of LDP-signaled dynamic multi-segment pseudo-wire(s), the normalized congestion indicator can be used as a constraint against path selection or path re-optimization for dynamic multi-segment pseudo-wires.

The label switched path re-route can be made over alternate paths or by a local repair via protection switching. The optimizing can include rerouting the route using a resource reservation protocol make-before-break procedure or a generalized multiprotocol label switching resource reservation protocol label switched path rerouting. An MPLS and/or GMPLS label switched path can be re-routed over more optimal paths using Make-Before-Break procedures of RSVP-TE or GMPLS-RSVP-TE LSP rerouting as described in RFC3209 and RFC3473.

In the case of protected TE LSPs (e.g., Fast reroute, RFC4090, and the like), a PLR (Point of Local Repair) node can be configured to monitor the label switched path's service quality by listening for normalized congestion indicator advertisements described hereby. The PLR node can determine if the label switched path's service quality has degraded below a pre-defined threshold of normalized congestion indicator value. The PLR node can trigger a protection switchover of the label switched path to its backup route, if the service quality of the label switched path has degraded beyond the tolerance level.

In step 120, the normalized congestion indicator is advertised to a second network element with a type length value (TLV) element. The congestion information is used as a TE link attribute and updated in TE link state databases (TE-LSDB) maintained by the TE-capable routers and/or switches. Routers and/or switches having a role of PLR can also use the TE link's congestion information as an indication of TE link quality degradation and trigger a local repair via protection switching.

In step 125, a time delay required to drain the queued traffic is determined (e.g., by estimating), based on an average queue length and a packet scheduling rate. The time delay can be advertised to a second network element with a type length value element. When the network has open shortest path first-traffic engineering (OSPF-TE) or intermediate system to intermediate system-traffic engineering (ISIS-TE) protocol enabled, the normalized congestion indicator and queue draining delay parameters can be advertised as measured TE link metric(s) to OSPF or IS-IS neighbors. The measured TE link metric(s) can be advertised in a sub-TLV(s) of a new optional TLV by extending OSPFv2 TE-LSA and/or OSPFv3's TE-LSA. Further, IS-IS's TE TLVs can also be extended to carry the measured TE link metric(s) in sub-TLV(s) of a new optional TLV. Whether or not an OSPF-TE or ISIS-TE speaking router will advertise the new link attribute TLV(s) via TE-LSA to a neighbor can be decided based on an OSPF/IS-IS router capability discovery performed during a neighbor relationship establishment. After receiving the receiving the measured TE link metric(s), the OSPF and/or IS-IS routers can update these link parameters in their TE link State Database (TE-LSDB).

Figure 2:
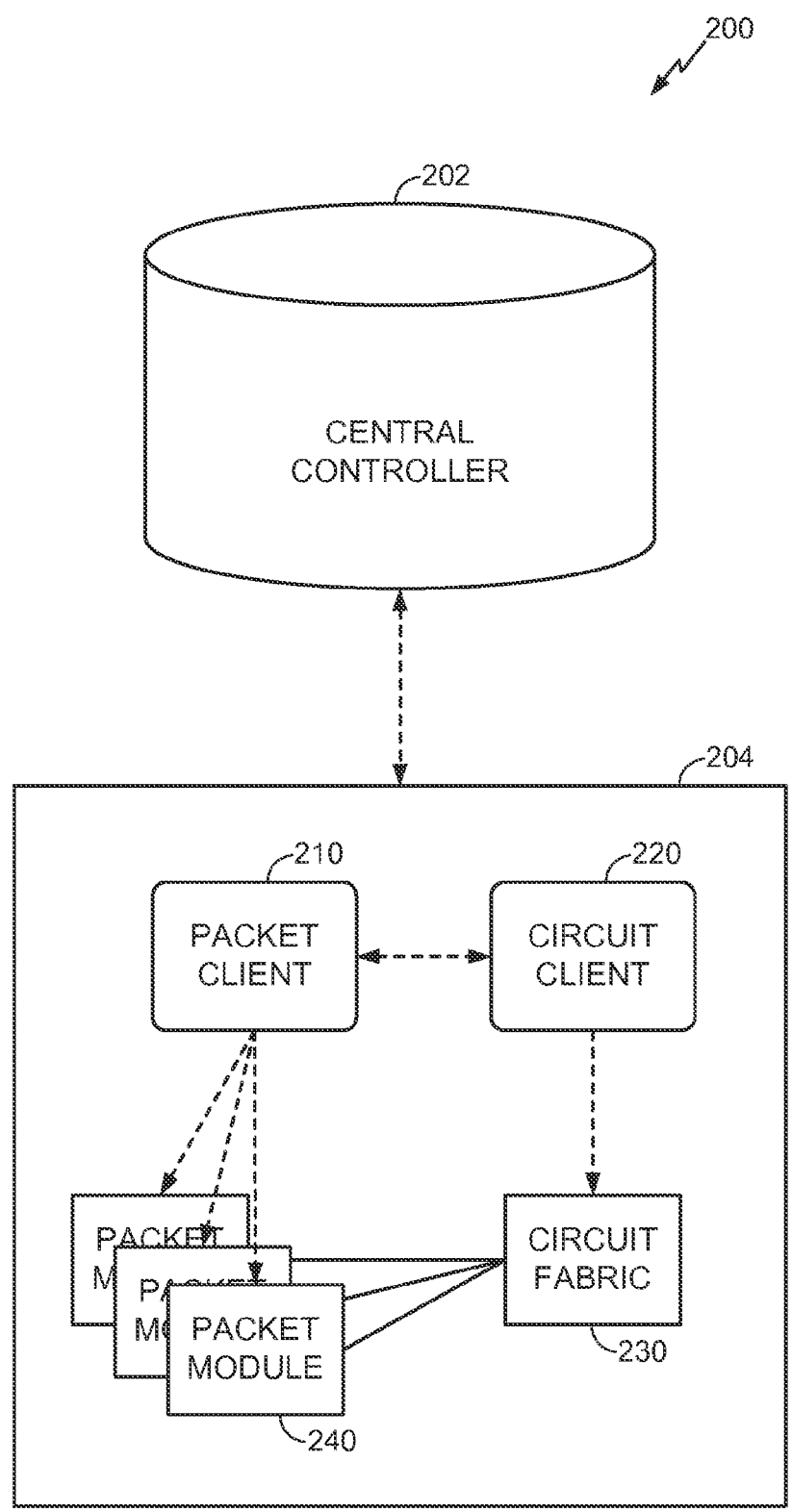
FIG. 2 depicts an exemplary OTN system including a central controller.

FIG. 2 depicts an exemplary OTN system 200 including a central controller 202. Here, the central controller 202 can be configured to handle packet and circuit control, as well as to handle packet control with a separate control system for circuit control. The central controller 202 is communicatively coupled to an OTN 204 and provides control functionality, such as managing flow and/or forwarding tables of the OTN 204. Additionally, the central controller 202 can also maintain the flow or forwarding tables of CE routers as well.

The OTN 204 includes hardware, software, and/or firmware configured to manage, switch, etc. circuit and packet data. For example, the OTN 204 can include a packet client module 210, a circuit client module 220, a circuit fabric module 230, and a packet module 240. Collectively, the packet client module 210, the circuit client module 220, the circuit fabric module 230, and the packet modules 240 are configured to interface with the OTN 204 and to switch data at Layers 0, 1, 2, and/or 3. For example, the packet client module 210 can include a data interface port (e.g., an Ethernet interface). The circuit client module 220 can include an optical interface port (e.g., SONET, SDH, OTN, and the like.). The circuit fabric module 230 can include a circuit switching fabric configured to switch SONET, SDH, OTN, and the like. The packet module 240 can include a packet switch configured to switch Layer 2 and/or 3 traffic. The modules 210, 220, 230, 240 and the central controller 202 can be coupled therebetween.

Figure 3:
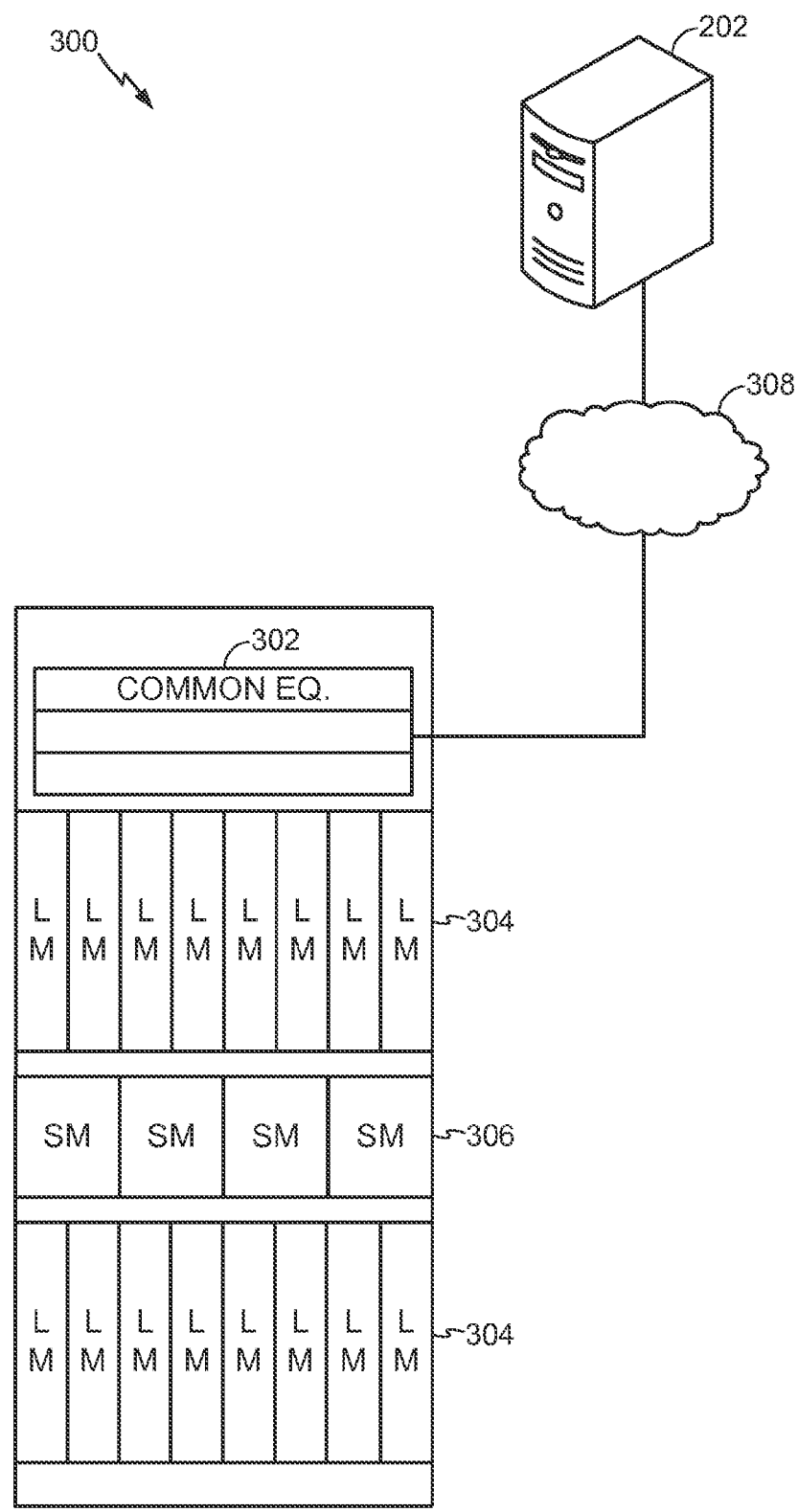
FIG. 3 depicts an exemplary network element within the OTN of FIG. 2.

FIG. 3 depicts an exemplary network element (NE) 300 within the OTN 204. In an exemplary embodiment, the NE 300 consolidates functionality of a multi-service provisioning platform (MSPP), digital cross connect (DCS), Ethernet and Optical Transport Network switch, dense wave division multiplexed (DWDM) platform, and the like. into a single, high-capacity intelligent switching system providing Layer 0, 1, and 2 consolidation. In another exemplary embodiment, the NE 300 can include a SONET add/drop multiplexer (ADM), an SDH ADM, an OTN ADM, a multi-service provisioning platform (MSPP), a digital cross-connect (DCS), and the like. Generally, the NE 300 includes common equipment 302, line modules (LM) 304, and switch modules (SM) 306.

The common equipment 302 can include a power supply; a control module (such as the control modules 400a, 400b); operations, administration, maintenance, and provisioning (OAM&P) access; and the like. The common equipment 302 can be coupled to the central controller 202 through a data communication network 308. Further, the common equipment 302 can be coupled to a management system other than the central controller 202 through the data communication network 308. The management system can include a network management system (NMS), element management system (EMS), and/or the like. Additionally, the common equipment 302 can include a control plane processor configured to operate a control plane, the LM 304, and the SM 306, as well as to execute at least a part of a method described herein.

The line modules 304 can be coupled to the switch modules 306, such as through a backplane, mid-plane, and/or the like. The line modules 304 are configured to provide ingress and egress to the switch modules 306, and are configured to provide interfaces for the NE 300 and services described herein. In an exemplary embodiment, the line modules 304 can form ingress and egress switches with the switch modules 306 as center stage switches for a three-stage switch. The line modules 304 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. Further, the line modules 304 can include a plurality of optical connections per module and each module can include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 304 can include a DWDM interface, a short reach interface, and the like, and can connect to a remote NE, end client device, an edge router, and the like. From a logical perspective, the line modules 304 provide ingress and egress ports to the NE 300, and each line module 304 can include one or more physical ports.

The switch modules 306 are configured to switch services between the line modules 304. For example, the switch modules 306 can provide wavelength granularity (Layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; Digital Signal n (DSn) granularity such as DS0, DS1, DS3, etc.; and the like. Specifically, the switch modules 306 can include both Time Division Multiplexed (TDM) (i.e., circuit switching) and packet switching engines. The switch modules 306 can include redundancy as well (e.g., 1:1, 1:N, etc).

The OTN 204 can include other components which are omitted for simplicity, and that the systems and methods described herein are contemplated for use with different network elements, such as the exemplary NE 300. For example, in another exemplary embodiment, the OTN 204 does not include the switch modules 306, but rather has the corresponding functionality in the line modules 304 in a distributed fashion. For the OTN 204, other architectures providing ingress, egress, and switching therebetween are also contemplated for the systems and methods described herein.

Figure 4:
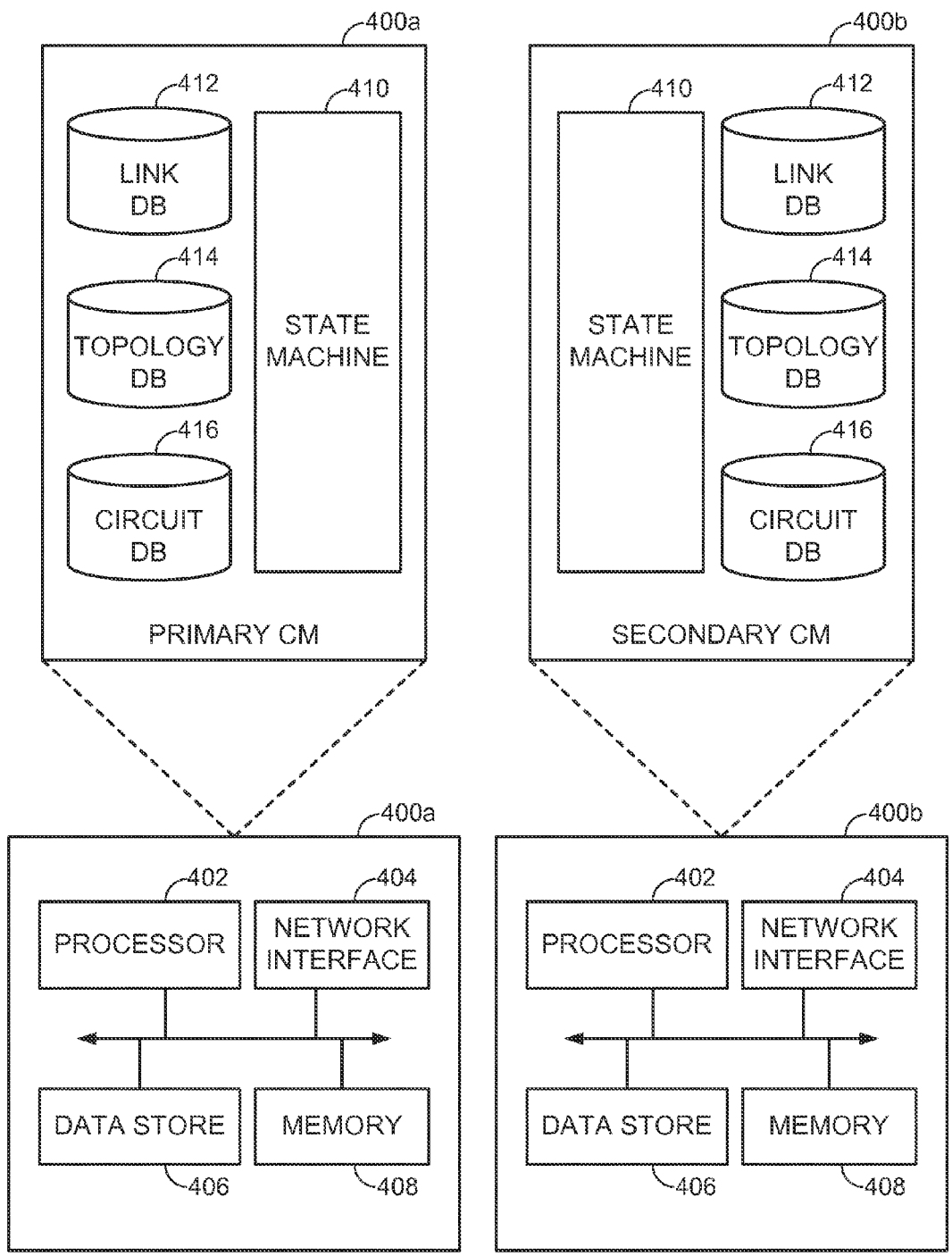
FIG. 4 depicts a block diagram of exemplary control modules in the network element of FIG. 3.

FIG. 4 depicts exemplary control modules 400a, 400b configured to perform control plane processing in the OTN 204. For example, the control plane can control GMPLS, MPLS, and the like, as described herein. The control modules 400a, 400b can include a processor 402 which is a hardware device for executing software instructions such as those which operate the control plane. The processor 402 can be any custom made or commercially available processor, a central processing unit (CPU), an auxiliary processor among several processors associated with the control modules 400a, 400b, a semiconductor-based microprocessor (in the form of a microchip or chip set), and/or any device configured to execute software instructions. The processor 402 is configured to execute software stored within memory, to communicate data to and from the memory, and to control operations of the control modules 400a, 400b pursuant to the software instructions.

The control modules 400a, 400b can also include a network interface 404, a data store 406, a memory 408, and the like, all of which can be coupled therebetween and with the processor 402. The network interface 404 can be used to enable the control modules 400a, 400b to communicate with a network, such as to communicate control plane information with other control modules, with a management system, with a controller and/or a proxy, and the like. The network interface 404 can include, for example, an Ethernet card (e.g., 10BaseT, Fast Ethernet, Gigabit Ethernet) and/or a wireless local area network (WLAN) card (e.g., 802.11a/b/g/n/ac). The network interface 404 can include address, control, and/or data connections to enable communications via the network.

The data store 406 can be used to store data, such as control plane information, provisioning data, OAM&P data, etc. The data store 406 can include volatile memory elements (e.g., random access memory (RAM, such as DRAM, SRAM, SDRAM, and the like)), nonvolatile memory elements (e.g., ROM, hard drive, tape, CD-ROM, and the like), and combinations thereof. Moreover, the data store 406 can incorporate electronic, magnetic, optical, and/or other types of data storage media.

The memory 408 can include any of volatile memory elements (e.g., random access memory (RAM, such as DRAM, SRAM, SDRAM, etc.)), nonvolatile memory elements (e.g., ROM, hard drive, tape, CD-ROM, etc.), and combinations thereof. Moreover, the memory 408 can incorporate electronic, magnetic, optical, and/or other types of data storage media. Further, the memory 408 can have a distributed architecture, where various components are situated remotely from one another, but can be accessed by the processor 402.

From a logical perspective, each of the control modules 400*a*, 400*b* can include a state machine 410, a link database (DB) 412, a topology DB 414, and a circuit DB 416. Generally, the control modules 400*a*, 400*b* execute software, perform processes, execute algorithms, etc. to control configurable features of a network, such as automating discovery of network elements, capacity on links, port availability on the network elements, connectivity between ports; dissemination of topology and bandwidth information between the network elements; calculation and creation of paths for connections; network level protection and restoration; and the like. The control modules 400*a*, 400*b* can be configured in a redundant configuration (e.g., 1+1, 1:1, etc.).

The state machine 410 is configured to implement at least a part of the methods described herein. The DBs 412, 414, 416 can be stored in the memory 408 and/or the data store 406. The link DB 412 can include updated information about each link in a network. The topology DB 414 can include updated information about the network topology, and the circuit DB 416 can include a listing of terminating circuits and transiting circuits in an optical transport system where the control modules 400*a*, 400*b* are located.

The control modules 400*a*, 400*b* can utilize control plane mechanisms to maintain the DBs 412, 414, 416. For example, messages can be used to discover and verify neighboring ports, nodes, protection bundles, boundary links, and the like. Also, the DBs 412, 414, 416 can share topology state messages to maintain identical data. Collectively, the state machine 410 and the DBs 412, 414, 416 can advertise a normalized congestion indicator, topology information, capacity availability, and provide connection management (provisioning and restoration). For example, each link in a network can have various attributes associated with it such as, for example, a normalized congestion indicator, line protection, available capacity, total capacity, administrative weight, protection bundle identification, delay, designation of boundary link, and the like. The state machine 410 and the DBs 412, 414, 416 can be configured to provide automated end-to-end provisioning. For example, a route for a connection can be computed from originating node to terminating node and optimized using a normalized congestion indicator and/or Dijkstra's Algorithm, i.e. shortest path from source to a destination based on the least administrative cost or weight, subject to a set of user-defined constraints.

The control modules 400*a*, 400*b* also can be configured to communicate with other control modules in other nodes in the OTN 204. This communication can be either in-band or out-of-band. For SONET networks and similarly for SDH networks, the control modules 400*a*, 400*b* can use standard or extended SONET line (or section) overhead for in-band signaling, such as the Data Communications Channels (DCC). Out-of-band signaling can use an overlaid Internet Protocol (IP) network such as, for example, User Datagram Protocol (UDP) over IP.

Figure 5:
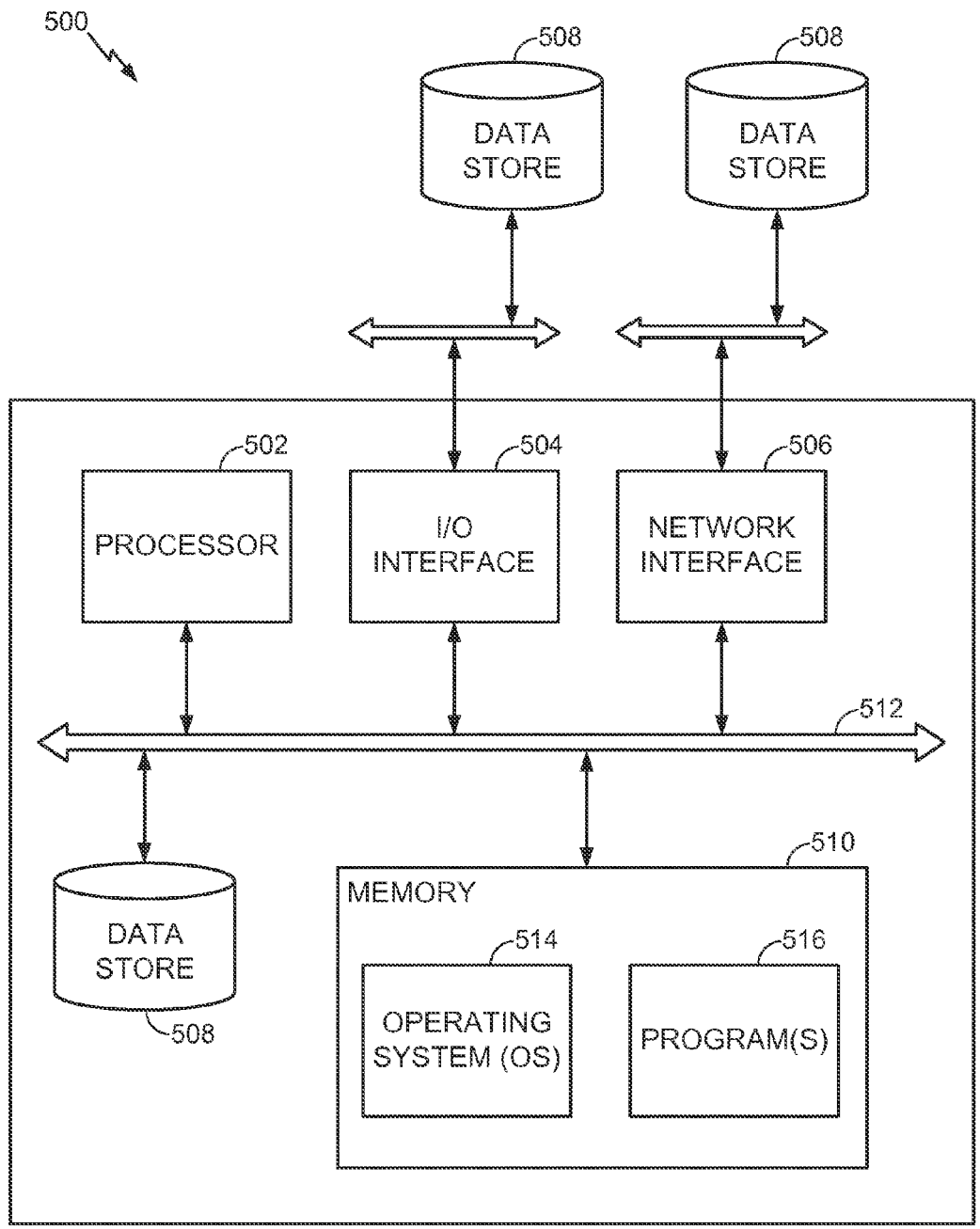
FIG. 5 depicts an exemplary diagram of a server which can be used as a central controller of the OTN of FIG. 2.

FIG. 5 depicts an exemplary diagram of a server 500 which can be used as the central controller 202 described herein. The server 500 can be a digital computer that, in terms of hardware architecture, includes a processor 502, an input/output (I/O) interface 504, a network interface 506, a data store 508, a memory 510, and/or a local interface 512. FIG. 5 depicts the server 500 in an oversimplified manner, and a practical embodiment can include additional components and processing logic to support conventional operating features that are not described in detail herein.

The processor 502 is a hardware device that can execute software instructions. The processor 502 can be any custom made or commercially available processor, a central processing unit (CPU), an auxiliary processor among several processors associated with the server 500, a semiconductor-based microprocessor (in the form of a microchip or chip set), or generally any device for executing software instructions. The processor 502 is configured to execute software stored within the memory 510, to communicate data to and from the memory 510, and to generally control operations of the server 500 pursuant to the software instructions.

The I/O interface 504 can receive user input from and/or provide system output to one or more devices and/or components. The I/O interface 504 can receive user input via, for example, a keyboard, touch pad, and/or a mouse. System output can be provided via a display device and/or a printer (not shown). The I/O interface 504 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, a universal serial bus (USB) interface and/or the like.

The network interface 506 enables the server 500 to communicate with a network, such as with CE routers and/or the OTN 204. The network interface 506 can include, for example, an Ethernet card or adapter (e.g., 10BaseT, Fast Ethernet, Gigabit Ethernet, 10 GbE, and/or the like) and/or a wireless local area network (WLAN) card and/or adapter (e.g., 802.11a/b/g/n/ac). The network interface 506 can provide address, control, and/or data communications to enable communications on the network.

Further, a data store 508 can be used to store data. The data store 508 can include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 can incorporate electronic, magnetic, optical, and/or other types of storage media. In one example, the data store 508 can be a part of the server 500 such as, for example, an internal hard drive connected to the local interface 512 in the server 500. Additionally in another embodiment, the data store 508 is external to the server 500 such as, for example, an external hard drive connected to the I/O interface 504 (e.g., via a SCSI or a USB connection). In a further embodiment, the data store 508 can be coupled to the server 500 through a network, such as, for example, a network attached file server.

The memory 510 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 can incorporate electronic, magnetic, optical, and/or other types of storage media. The memory 510 can have a distributed architecture, where various components are situated remotely from one another, but can be accessed by the processor 502. Software stored in memory 510 can include one or more software programs, each of which includes an ordered listing of executable instructions for implementing logical functions. The software in the memory 510 includes a suitable operating system (O/S) 514 and one or more programs 516. The operating system 514 controls execution of other computer programs, such as the one or more programs 516, and can provide scheduling, input-output control, file and data management, memory management, and communication control and related services. The one or more programs 516 can be configured to implement at least a part of the processes, algorithms, methods, techniques, etc. described herein.

The local interface 512 can couple the processor 502, the input/output (I/O) interfaces 504, the network interface 506, the data store 508, and/or the memory 510. The local interface 512 can be, for example but not limited to, a bus or other wired or wireless connections. The local interface 512 can have additional elements, which are omitted herein for simplicity, such as controllers, buffers (caches), drivers, repeaters, and receivers, among many others, to enable communications. Further, the local interface 512 can provide address, control, and/or data communications to enable communications among the processor 502, the input/output (I/O) interfaces 504, the network interface 506, the data store 508, and the memory 510.

The following section describes describe details of exemplary message encapsulation procedures for OSPF-TE and ISIS-TE protocol extensions that can be used to distribute congestion information of a switching node.

1. Switching System Congestion Management Capability Discovery

In MPLS/GMPLS Traffic Engineering networks, it's often desirable to know if certain LSR nodes are capable of performing congestion management and congestion information propagation. Provided are protocol extensions of OSPF-TE and ISIS-TE to advertise such capabilities. The OSPF-TE and ISIS-TE speaking LSRs learn from such advertisements, if one or more neighbors are capable of propagating control plane and/or data plane congestion information. A Head-end LSR(s) would use such information during path computation, for example to determine if a tunnel path is feasible that would include congestion management capable LSR nodes and/or if a tunnel path is feasible that would exclude currently known congested LSR(s). A Head-end LSR would use such information e.g. congestion management capability and already congested nodes, as constraints to find feasible path(s) either during new tunnel setup or existing tunnel re-route or re-optimization. Existing IETF standard RFC 4970, defines details of OSPF-based Router Capability advertisements. Also, existing IETF standard RFC 4971, defines the details of IS-IS based Router Capability advertisements. Thus, provided is: (1) a new TLV for OSPF, as TE Node Congestion Management Capability Descriptor (CMCD) TLV, to be carried within the Router Information LSA and (2) a new sub-TLV for IS-IS, as TE Node Congestion Management Capability Descriptor (CMCD) sub-TLV, to be carried within the IS-IS Capability TLV.

2. IGP-TE Node Congestion Management Capability Descriptor

TE-capable LSR nodes might be able to detect and propagate congestion status of data plane and control plane, during heavy traffic load situation. Such TE LSR(s) should advertise their capabilities to neighbors, after adjacency is established. LSR nodes that receive such capability information, can optimally compute LSP paths either excluding such nodes or including those nodes.

2.1 TE Node CMCD TLV Value Bit Flags

The TE Node CMCD TLV Value includes a set of bit flags, where each bit represents a specific TE congestion management capability. Defined are Congestion Management capabilities:

Bit CM Capability Type

0 D bit—Data Plane congestion Advertisement. When set, this flag indicates that the LSR is capable of advertising data plane congestion status.

1 C bit—Control Plane congestion Advertisement. When set, this flag indicates that the LSR is capable of advertising control plane congestion status.

2 P bit—Primary LSP Congestion Repair Advertisement. When set, this flag indicates that the LSR is capable of congestion repair of primary path, i.e. capable of protection switchover when a protected primary path is congested at downstream LSR.

3 B bit—Backup LSP Congestion Reroute Advertisement. When set, this flag indicates that the LSR is capable of congestion repair of backup path, i.e. capable of rerouting backup path, to an alternate path that is not congested at downstream LSR(s).

4 S bit—FRR Bypass Tunnel Congestion Reroute Advertisement. When set, this flag indicates that the LSR is capable of congestion repair of Bypass Tunnel path, i.e. capable of rerouting Bypass Tunnel, to an alternate path that is not congested at downstream LSR(s).

2.2 OSPF-TE Node Congestion Management Capability Descriptor

The OSPF-TE Node Congestion Management Capability Descriptor (OSPF-TE NCMCD) TLV is a variable length TLV that includes a triplet {Type, Length, Value}, where 'Type' field is 2 octets, Length field is also 2-octets and the 'Value' field is multiples of 32-bit words. The Value filed is an array of Bit flags as defined above. The OSPF-TE NCMCD TLV has the same format as the TLV used in Traffic Engineering extension of OSPF [RFC3630]. The NCMCD TLV is carried as an optional TLV within an OSPF Router Information LSA, which is defined in IETFC RFC4970.

2.2.1 OSPF-TE NCMCD TLV Structure

The OSPF-TE NCMCD TLV has the following format:

TYPE: 32772 (Taken from the experimental sub-range for types as documented in RFC 4970. This sub-range is not controlled by the TANA registry).

LENGTH: Variable (Multiple of 4).

VALUE: Array of units of 32 Bit Flags numbered from the MSB bit as Bit zero, where each Bit Flag represents a TE node's congestion management capability.

2.3 ISIS-TE Node Congestion Management Capability Descriptor

The ISIS-TE Node Congestion Management Capability Descriptor (ISIS-TE NCMCD) sub-TLV is a variable length TLV that includes a triplet {Type, Length, Value}, where 'Type' field is 1 octet, Length field is 1 octet specifying the length of the value field, and the 'Value' field is multiples of octets. The Value field includes an array of Bit flags as defined above. The ISIS-TE NCMCD sub-TLV has the same format as the sub-TLV used in Traffic Engineering extension of IS-IS [RFC3784]. The ISIS-TE NCMCD sub-TLV is carried as an optional sub-TLV within an IS-IS CAPABILITY TLV, which is defined in IETFC RFC4971.

2.3.1 ISIS-TE NCMCD Sub-TLV Structure

The ISIS-TE NCMCD sub-TLV has the following format:

TYPE: XX (Value to be assigned from the current unused sub-range for types as documented in RFC 5305).

LENGTH: Variable (Multiple of 1).

VALUE: Array of units of 8 Bit Flags numbered from the MSB bit as Bit zero, where each Bit Flag represents a TE node's congestion management capability.

2.4 IGP-TE Node CMCD Advertisement Processing

The TE Node CMCD is advertised by a TE LSR to it's neighbors via OSPFv2 or OSPV3 Router Capability information advertisement, if the LSR has OSPF adjacency established with the neighbors. However, if the LSR has IS-IS adjacency established with the neighbors, then TE Node CMCD will be advertised via IS-IS Router Capability information advertisement. When a TE LSR learns CM capability via the CMCD advertisement, the TE LSR can use such information as a constraint for Path computation, so as to include such CM capable nodes along the LSP path for new or re-routing Tunnel. When the CM capability is first configured on a LSR node, the node will advertise CMCD capability to it's TE capable neighbors. Subsequently, if the CM capability configuration of the TE node changes, i.e. capability is disabled or enabled via CLI, then the TE node will re-advertise the TE node's updated CM capability in a new OSPF RI LSA or IS-IS RI LSP. A TE node will also advertise a new OSPF RI LSA or IS-IS RI LSP including the TE Node CMCD TLV or sub-TLV, when the regular refresh is needed for the OSPF LSA or IS-IS LSP. If a TE LSR does not receive the CMCD advertisement from one or more neighbors, then the TE LSR will assume those neighbors are not capable of monitoring congestion status of the Data Plane or Control Plane and/or not capable of propagating any congestion information via OSPF or IS-IS routing extensions. When an LSR node receives a new or updated CMCD, via OSPF RI LSA or IS-IS RI LSP, the reach-ability of one or more TE routed destinations can be affected due to pre-existing policies or path constraints. Thus, the local TE node can schedule CSPF computation to re-validate or re-optimize the TE paths of existing MPLS/GMPLS Tunnels originating from this node.

2.4.1 OSPF-TE Node CMCD Advertisement Procedure

When a OSPF-TE or GMPLS-OSPF-TE extension is used for Traffic engineering in MPLS/GMPLS networks, the LSR nodes will advertise their CM capabilities via OSPFv2 Router Information LSA, (Opaque type of 4 and Opaque ID of 0) or via OSPFv3 Router Information LSA, (Function code of 12). The LSA transmission and reception procedures will follow those mentioned in RFC 4970. The flooding scope for these LSAs are Area-local and so these should be carried within OSPFv2 Type-10 RI LSA or within OSPFv3 RI LSA, with 51 bit set and the S2 bit cleared. Since the congestion detection and advertisement as proposed in this document is meant for MPLS/GMPLS traffic engineered networks, unless a routing/switching node is TE capable, the node must not advertise CMCD TLV within OSPFv2/OSPFv3 Router Information LSA.

2.4.2 ISIS-TE Node CMCD Advertisement Procedure

When a ISIS-TE or GMPLS-ISIS-TE extension is used for Traffic engineering in MPLS/GMPLS networks, the LSR nodes will advertise their CM capabilities via IS-IS Capability Information TLV. The LSP transmission and reception procedures will follow those mentioned in RFC 4971. The flooding scope for the CMCD sub-TLV is Area-local and so the CMCD sub-TLV should be carried within an IS-IS CAPABILITY TLV with S Flag cleared. Since the congestion detection and advertisement as proposed in this document is meant only for MPLS/GMPLS traffic engineered networks, unless a routing/switching node is TE capable, the node MUST NOT, advertise CMCD sub-TLV, within IS-IS CAPABILITY TLV.

2.5 Backward Compatibility of CMCD Advertisement

The CMCD TLV defined in this document does not introduce any interoperability issues. An OSPFv2/OSPFv3 router that does not support/recognize the CMCD TLV, would silently ignore the TLV, when received in RI LSA. An IS-IS router that does not support/recognize the CMCD sub-TLV, would silently ignore the sub-TLV, when received in CAPABILITY TLV of RI LSP. If the CMCD TLV or CMCD sub-TLV is absent in a received OSPFv2/OSPFv3 RI LSA or IS-IS CAPABILITY TLV, respectively then the CM capability of the sending Node is unknown. Reception of a CMCD TLV or CMCD sub-TLV can trigger CSPF path computation and consequently impact the reach-ability or optimality of TE Tunnels in the MPLS/GMPLS TE networks. However, IP routing is not impacted, since normal SPF calculation for OPSF or IS-IS routing is not affected by receiving any CMCD TLV or CMCD sub-TLV.

3. Switching System Congestion Measurement Procedure 3.1 Congestion Measurement Configuration Parameters In order to monitor and determine the congestion status of both data plane and control plane, a switching system needs to be configured with minimum and maximum threshold parameters for the switching resource utilization by traffic. The following configuration parameters are needed for data plane congestion status determination. Modern Ethernet switching hardware allows separate packet buffer pool management at multiple different levels of control, simultaneously, for share of packet memory usage among competing traffic flows.

3.1.1 Data Plane Node-Wide Global Packet Buffer Pool Management

NTh_Min—Minimum threshold for the packet buffer usage count, from node wide global packet buffer pool, at which congestion starts. When the packet buffer usage count is below this threshold, the switching data plane is considered non-congested at the global level.

NTh_Max—Maximum threshold for the packet buffer usage count, from node wide global packet buffer pool. The congestion status starts from the minimum threshold and grows up to the maximum threshold. When the usage count exceeds the maximum threshold, the switch is considered 100% congested w.r.t. the global packet buffer pool.

3.1.2 Data Plane Per-Link Packet Buffer Pool Management

A Switching hardware can support up-to 'Max_Link' number of Link(s).

LTh_Min(L)—Minimum threshold for the packet buffer usage count, from per-Link packet buffer pool for Link 'L', where 0<=L<=Max_Link. When the packet buffer usage count is below this threshold, the switching data plane is considered non-congested at the Link level.

LTh_Max(L)—Maximum threshold for the packet buffer usage count, from per-Link packet buffer pool for Link 'L', where 0<=L<=Max_Link. The congestion status starts from the minimum threshold and grows up to the maximum threshold. When the usage count exceeds the maximum threshold, the switch is considered 100% congested w.r.t. per-Link packet buffer pool.

3.1.3 Data Plane Per-Queue Packet Buffer Pool Management

A Switching hardware can support up-to 'Max_Que' prioritized traffic queues on each Link, at the egress side of the packet switching pipeline, where Que(P) represents traffic queue at priority 'P' (0<=P<=Max_Que). Modern Ethernet switching H/W supports up-to 8 traffic queues on each Link, at the egress pipeline, so that Max_Que=8. QTh_Min(L, P)—Minimum threshold for the queue length in terms of packet buffers, for the queue priority 'P', on Link 'L', where 0<=P<=Max_Que, 0<=L<=Max_Link. When the packet buffer usage count is below this threshold, the switching data plane is considered non-congested at that priority level for the given Link. QTh_Max(L, P)—Maximum threshold for the queue length in terms of packet buffers, for the queue priority 'P', on Link 'L', where 0<=P<=Max_Que, 0<=L<=Max_Link. The congestion status starts from the minimum threshold and grows up to the maximum threshold. When the usage count exceeds the maximum threshold, the switch is considered 100% congested at that priority level for the given Link.

3.1.4 Control Plane Node-Wide Congestion Control Parameters

The following configuration parameters can be used for control plane congestion status determination:

CpuTh_Min—Minimum threshold for the overall percentage CPU utilization, by the control plane software components, including routing & signaling protocol processes.

CpuTh_Max—Maximum threshold for the overall percentage CPU utilization, by the control plane software components, including routing & signaling protocol processes.

MemTh_Min—Minimum threshold for the overall percentage memory utilization, by the control plane software components, including routing & signaling protocol processes.

MemTh_Max—Maximum threshold for the overall percentage memory utilization, by the control plane software components, including routing & signaling protocol processes.

3.2 Switching Data Plane Congestion Measurement Procedure

Modern hardware switches are capable of classifying network traffic streams into one or more priority traffic flows, based on the packet header contents and the classification rules/policy configured on the switches. Thus, if at any instant a given traffic flow TF(P) at a priority level 'P', which is admitted by the switch, consumes packet buffers from different levels of buffer pools in the following proportions:

'X' number of packet buffers from the per-Link, per-Queue packet buffer pool.

'Y' number of packet buffers from the per-Link, packet buffer pool.

'Z' number of packet buffers from the Node wide global, packet buffer pool.

then, data plane congestion status at that instant can be expressed as follows.

3.2.1 Data Plane per-Queue Congestion Status Calculation

If X<QTh_Min(L, P), then Data Plane Queue at priority level 'P' on Link 'L' is non-congested.

If QTh_Min(L, P)<=X<=QTh_Max(L, P), then Data Plane Queue at priority level 'P' on Link 'L' is congested, by a factor of QCF(L,P)=[X−QTh_Min(L,P)]/[QTh_Max(L,P)−QTh_Min(L,P)]. The percentage congestion status in this case can be expressed as PQCI(L,P)=[QCF(L,P)×100] %.

If X>QTh_Max(L, P), then Data Plane Queue at priority level 'P' on Link 'L' is considered fully congested, i.e. 100%.

3.2.2 Data Plane Per-Link Congestion Status Calculation

If Y<LTh_Min(L), then Data Plane Link level resources on Link 'L' is non-congested.

If LTh_Min(L)<=Y<=LTh_Max(L), then Data Plane Link level resources on Link 'L' is congested, by a factor of LCF(L)=[Y−LTh_Min(L)]/[LTh_Max(L)−LTh_Min(L)].

The percentage congestion status in this case can be expressed as PLCI(L)=[LCF(L)×100]%.

If Y>LTh_Max(L), then Data Plane Link level resources on Link 'L' is considered fully congested, i.e. 100%.

3.2.3 Data Plane Node wide Global Congestion Status Calculation

If Z<NTh_Min, then Data Plane node wide global resource is non-congested.

If NTh_Min<=Z<=NTh_Max, then Data Plane node wide global resource is congested, by a factor of NCF=[Z−NTh_Min]/[NTh_Max−NTh_Min]. The percentage congestion status in this case can be expressed as PNCI=[NCF×100]%.

If Z>NTh_Max, then Data Plane node wide global resource is considered fully congested, i.e. 100%.

3.3 Switching Control Plane Congestion Measurement Procedure

At present, modern Ethernet switching platforms use embedded software infrastructure that are capable of monitoring and calculating percentage utilization of control plane CPU and Memory by the control plane software processes, including routing and signaling protocols. Thus, if at any instant the overall utilization of CPU and memory by the control plane software applications, can be expressed as follows:

'C'—percentage utilization of CPU(s) by the control plane software applications.

'M'—percentage utilization of system memory by the control plane software applications.

then control plane congestion status at that instant can be expressed as follows:

If C<CpuTh_Min, then Control Plane CPU resource is non-congested.

If CpuTh_Min<=C<=CpuTh_Max, then Control Plane CPU resource is congested, by a factor of CpuCF=[C−CpuTh_Min]/[CpuTh_Max−CpuTh_Min]. The percentage congestion status in this case can be expressed as PCpuCI=[CpuCF×100]%.

If C>CpuTh_Max, then Control Plane CPU resource is considered fully congested, i.e. 100%.

If M<MemTh_Min, then Control Plane Memory resource is non-congested.

If MemTh_Min<=M<=MemTh_Max, then Control Plane Memory resource is congested, by a factor of MemCF=[C−MemTh_Min]/[MemTh_Max−MemTh_Min]. The percentage congestion status in this case can be expressed as PMemCI=[MemCF×100]%.

If M>MemTh_Max, then Control Plane Memory resource is considered fully congested, i.e. 100%.

3.4 Smoothly Averaged Congestion Level Measurement

During temporary network failures, software or hardware glitches, one or more traffic flows through the switching systems can experience transient traffic loss, due to congestion overload, queuing drops and excessive transmission delays. However, transient traffic loss can recover and switching delays can return to normalcy, after a network convergence. Thus if congestion level measured during transient congestion situation is instantly advertised to OPSF-TE or ISIS-TE neighbors, then frequent flooding of TE LSA or TE LSPs can contribute to more congestion. As a result of this frequent reroute of MPLS/GMPLS Tunnels over narrowly stable paths can result in further instability of the traffic engineering networks. Provided is a mechanism to calculate a cumulative average value of measured congestion levels of monitored resources during each recurring measurement interval. To compute smooth cumulative average values of the congestion level of a switching system resource, over a chosen periodic measurement interval, an Auto-Regressive Moving Average (ARMA) statistical model can be used. An ARMA model usually produces an exponentially weighted moving average (EWMA), $A_{n+1} = \lambda * A_n + (1 - *A_{n-1}$, where $A_n$ represents n-th iterative averaged value, and $0<\lambda<1$, which is a smoothed quantity as opposed to a spiked uneven data. For numerical computation on digital computers, the above EWMA function can be approximated using a Step function.

4. Switching System Congestion Advertisement Protocol

The switching node can periodically perform congestion status monitoring and congestion level calculation, for the data plane and/or control plane, if operator has enabled this action via configuration. In the switching system, once the data plane and/or control plane congestion level is calculated, these information can be advertised to the routing neighbors of the local node using OSPF-TE and/or ISIS-TE protocol extensions. The switching node can choose not to advertise congestion level information to a neighbor, whose CM capability is unknown. The CM capability of a OSPF or IS-IS neighboring router is considered unknown, if the CM capability had not advertised, the CMCD TLV in OSPFv2/OSPFv3 RI LSA or not advertised CMCD sub-TLV in IS-IS CAPABILITY TLV.

4.1 OSPF-TE Extension for Congestion Advertisement

Provided are new extensions to the OSPF-TE and GMPLS-OSPF-TE's TE LSA advertisement protocols, which are defined in IETF standards, RFC3630, RFC4202, RFC4203. These enhancements to the Traffic Engineering properties of OSPF routing and GMPLS-OSPF routing capable Links can be announced in OSPF-TE LSAs. The TE LSA, which is an opaque LSA with Area flooding scope [RFC3630], has a top-level TLV and one or more nested sub-TLVs for extensibility. Both the TLV and nested sub-TLVs are 32-bit aligned. Provided are enhancements to existing top-level TLV, viz. Link TLV by adding new sub-TLVs and define a new top-level TLV, 'Extended Node TE Status Attribute' (ENTESA), to support advertisement of switching node's congestion status information.

4.1.1 Node-Level Congestion Status Encoding in OSPF-TE

The node level congestion status will be encoded in a new TLV, 'Extended Node TE Status Attribute' (ENTESA). This TLV has the following data structure:

TLV TYPE: 2 Octet [32772, LANA registration not required for the experimental range 32768-32777].

TLV Length: 2 Octet indicating total length of a number of optional sub-TLVs.

TLV Value: 8*N Octets of sub-TLVs, of the following types.

4.1.1.1 Node's Data Plane Buffer Space Congestion Level Indicator Sub-TLV

This sub-TLV includes the Data Plane's node wide global packet buffer space's congestion level expressed in percentage unit. This sub-TLV is optional and can appear at most once in the 'ENTESA' TLV. This sub-TLV is useful for traffic engineering policy constrained path computation.

sub-TLV TYPE: 2 Octet [32771, LANA registration not required for the experimental range 32768-32777].

sub-TLV Length: 2 Octet (Length of the value field=1).

sub-TLV Value: 4 Octet (Congestion level value between 0%-100%).

4.1.1.2 Node's Control Plane Processor Congestion Level Indicator Sub-TLV

This sub-TLV includes the Control Plane processor's relative computational power utilization, expressed in percentage unit. This sub-TLV is optional and can appear at most once in the 'ENTESA' TLV. This sub-TLV is useful for traffic engineering policy constrained path computation.

sub-TLV TYPE: 2 Octet [32772, LANA registration not required for the experimental range 32768-32777].

sub-TLV Length: 2 Octet (Length of the value field=1).

sub-TLV Value: 4 Octet (Congestion level value between 0%-100%).

4.1.1.3 Node's Control Plane Memory Congestion Level Indicator Sub-TLV

This sub-TLV includes the Control Plane's memory space relative utilization expressed in percentage unit. This sub-TLV is optional and can appear at most once in the 'ENTESA' TLV. This sub-TLV is useful for traffic engineering policy constrained path computation.

sub-TLV TYPE: 2 Octet [32773, LANA registration not required for the experimental range 32768-32777].

sub-TLV Length: 2 Octet (Length of the value field=1).

sub-TLV Value: 4 Octet (Congestion level value between 0%-100%).

4.1.2 Link Level Congestion Status Encoding in OSPF-TE

The Link level congestion status will be encoded in new sub-TLVs, of the existing top-level TLV 'Link TLV' (TLV Type 2).

4.1.2.1 Data Plane per-Link Buffer Space Congestion Level Indicator Sub-TLV.

This sub-TLV includes the Data Plane's per-Link packet buffer space's congestion level expressed in percentage unit. This sub-TLV is optional and should appear at most once in a 'Link TLV'. This sub-TLV is useful for traffic engineering policy constrained path computation at Head End LSR. An LSR can also make use of this congestion information for Policy based Admission Control of new LSP setup requests and policy based pre-emption of already established LSPs.

sub-TLV TYPE: 2 Octet [32771, LANA registration not required for the experimental range 32768-32777].

sub-TLV Length: 2 Octet (Length of the value field=1).

sub-TLV Value: 4 Octet (Congestion level value between 0%-100%).

4.1.2.2 Data Plane per-Priority Buffer Space Congestion Level Indicator Sub-TLV This sub-TLV includes the Data Plane's egress queue priority specific, packet buffer space's congestion level expressed in percentage unit. This sub-TLV is optional and should appear at most once in a 'Link TLV'. This sub-TLV includes an array of 8 congestion level numbers, one for each preemption priority level. These 8 values would indicate congestion levels correspond to 8 LSP setup priorities starting from '0' up-to '7' in the increasing order. This congestion information is useful for traffic engineering policy constrained path computation at Head End LSR. An LSR can also make use of this congestion information for Policy based Admission Control of new LSP setup requests and policy based pre-emption of already established LSPs.

sub-TLV TYPE: 2 Octet [32772, LANA registration not required for the experimental range 32768-32777].

sub-TLV Length: 2 Octet (Length of the value field=1).

sub-TLV Value: 4 Octet (Congestion level value between 0%-100%).

4.2 ISIS-TE Extension for Congestion Advertisement

Defined are new extensions to the ISIS-TE and GMPLS-ISIS-TE's TE LSP advertisement protocols, which are defined in IETF standard, RFC5305. These enhancements to the Traffic Engineering properties of IS-IS routing and GMPLS-ISIS routing capable Links can be announced in IS-IS Link State Protocol Data Units (LSPs). For traffic engineering purposes, IS-IS LSP is used to carry a top-level TLV and one or more nested sub-TLVs in it for extensibility. The existing top-level TLV is enhanced, 'Extended IS Reachability TLV' by adding new sub-TLVs and define a new top-level TLV, 'Extended Node TE Status Attribute' (ENTESA), to support advertisement of switching node's congestion status information.

4.2.1 Node-Level Congestion Status Encoding in ISIS-TE

The node level congestion status will be encoded in a new TLV, 'Extended Node TE Status Attribute' (ENTESA). This TLV has the following data structure:

TLV TYPE: 1 Octet (Value To be assigned later by IANA).

TLV Length: 1 Octet indicating total length of a number of optional sub-TLVs.

TLV Value: 0-253 octets of sub-TLVs, of the following types.

4.2.1.1 Node's Data Plane Buffer Space Congestion Level Indicator Sub-TLV

This sub-TLV includes the Data Plane's node wide global packet buffer space's congestion level expressed in percentage unit. This sub-TLV is optional and can appear at most once in the 'ENTESA' TLV. This sub-TLV is useful for traffic engineering policy constrained path computation.

sub-TLV TYPE: 1 Octet (Experimental Value=1)
sub-TLV Length: 1 Octet (Length of the value field=1).
Sub-TLV Value: 1 Octet (Congestion level value between 0%-100%).

4.2.1.2 Node's Control Plane Processor Congestion Level Indicator Sub-TLV

This sub-TLV includes the Control Plane processor's relative computational power utilization, expressed in percentage unit. This sub-TLV is optional and can appear at most once in the 'ENTESA' TLV. This sub-TLV is useful for traffic engineering policy constrained path computation.

sub-TLV TYPE: 1 Octet (Experimental Value=2)
sub-TLV Length: 1 Octet (Length of the value field=1).
Sub-TLV Value: 1 Octet (Congestion level value between 0%-100%).

4.2.1.3 Node's Control Plane Memory Congestion Level Indicator Sub-TLV

This sub-TLV includes the Control Plane's memory space relative utilization expressed in percentage unit. This sub-TLV is optional and can appear at most once in the 'ENTESA' TLV. This sub-TLV is useful for traffic engineering policy constrained path computation.

sub-TLV TYPE: 1 Octet (Experimental Value=3)
sub-TLV Length: 1 Octet (Length of the value field=1).
Sub-TLV Value: 1 Octet (Congestion level value between 0%-100%).

4.2.2 Link Level Congestion Status Encoding in ISIS-TE

The Link level congestion status will be encoded in new sub-TLVs, of the existing top-level TLV 'Extended IS Reachability TLV' (TLV Type 22).

4.2.2.1 Data Plane per-Link Buffer Space Congestion Level Indicator Sub-TLV This sub-TLV includes the Data Plane's per-Link packet buffer space's congestion level expressed in percentage unit. This sub-TLV is optional and should appear at most once in each 'Extended IS Reachability TLV'. This sub-TLV is useful for traffic engineering policy constrained path computation at Head End LSR. An LSR can also make use of this congestion information for Policy based Admission Control of new LSP setup requests and policy based pre-emption of already established LSPs.

sub-TLV TYPE: 1 Octet (To be assigned from the unused range [23,249] by IANA later)
sub-TLV Length: 1 Octet (Length of the value field=1).
sub-TLV Value: 1 Octet (Congestion level value between 0%-100%).

4.2.2.2 Data Plane per-Priority Buffer Space Congestion Level Indicator Sub-TLV This sub-TLV includes the Data Plane's egress queue priority specific, packet buffer space's congestion level expressed in percentage unit. This sub-TLV is optional and should appear at most once in each 'Extended IS Reachability TLV'. This sub-TLV includes an array of 8 congestion level numbers, one for each preemption priority level. These 8 values would indicate congestion levels correspond to 8 LSP setup priorities starting from '0' up-to '7' in the increasing order. This congestion information is useful for traffic engineering policy constrained path computation at Head End LSR. An LSR can also make use of this congestion information for Policy based Admission Control of new LSP setup requests and policy based pre-emption of already established LSPs.

sub-TLV TYPE: 1 Octet (To be assigned from the unused range [23,249] by IANA later)
sub-TLV Length: 1 Octet (Length of the value field=1).
Sub-TLV Value: 1 Octet (Congestion level value between 0%-100%).

4.3 Congestion Status Advertisement Scaling and Performance

In an example, when the periodic congestion monitor detects a change in the congestion level, as calculated based on the comparison of switching systems resource usage against the pre-defined minimum and maximum thresholds, the OSPF-TE LSA or ISIS-TE LSP origination would be triggered inside the routing/switching system. However not every change in the congestion level needs to be flooded via OSPF-TE LSA or ISIS-TE LSP. The originations of TE LSA(s) or TE LSP(s) should be rate-limited to one per certain configured time interval. When a large number of MPLS or GMPLS traffic engineered Tunnels with bandwidth reservation are established or destroyed in the switching system, the OSPF-TE and ISIS-TE protocols are required to flood large number of traffic engineering LSA(s)/LSP(s) throughout the TE area. Also, during a network outage (in terms of a Link going down or node going down), the Head End LER will be busy doing many CSPF computations and tunnel re-route or re-optimization signaling. This triggers OSPF-TE LSA or ISIS-TE LSP flooding with up-to-date TE Link properties, which can contribute to the further elevated level of congestion at data plane or control plane or both, resulting in OSPF or IS-SIS PDU drops. Thus, in order to achieve a scalable performance and robust behavior of the switching system during the heavy congestion load, OSPF and IS-IS control packets are given prioritized treatment via DSCP packet marking and PHB scheduling as recommended in IETF RFC 4222. To reduce the congestion overhead due to LSA or LSP retransmission, an exponential back-off algorithm should be used for the retransmission interval computation as recommended in IETF RFC 4222.

4.4 LSR Node Behavior During Congestion Advertisement

After receiving OSPF-TE LSA or ISIS-TE LSP advertisements, an LSR node should not attempt to re-route or re-optimize all Tunnel paths simultaneously, as the attempt might trigger heavy load on control plane processor or memory, contributing to the further congestion level elevation at the local LSR node. Thus, LSR nodes should be able to throttle the maximum number of LSPs that can be re-optimized or re-routed after a hold down timer. Also, the maximum number of new LSP signaling setup(s) or routing adjacency establishment at a LSR node should be throttled.

Figure 6A:
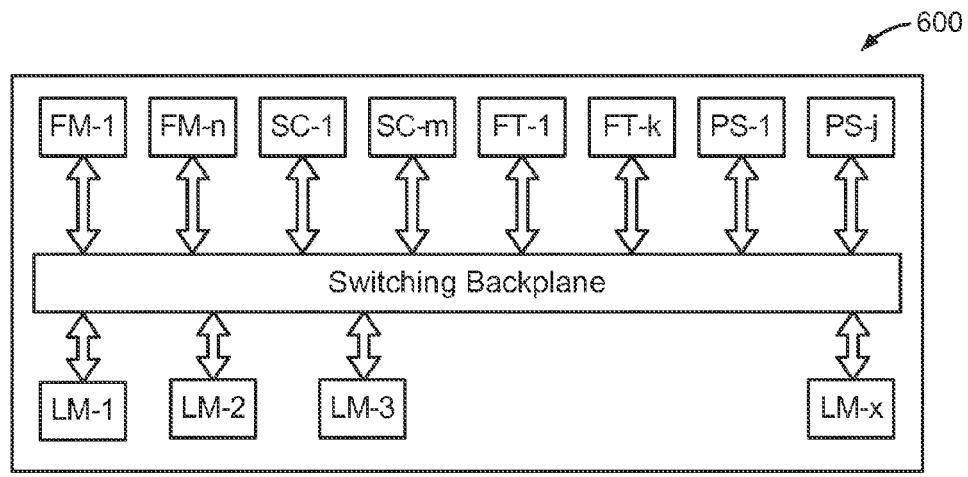
FIG. 6A depicts an exemplary switching system congestion management interaction diagram.

FIG. 6A depicts an exemplary switching system congestion management interaction diagram 600. FIG. 6 depicts a distributed chassis-based, switching system internal block diagram having control path connections of 'n' number of Fabric Modules (FM), 'm' number of Supervisory Cards (SC), 'k' number of Fan Trays (FT), 'j' number of Power Supply Modules (PS) and 'x' number of Line Modules (LM), with a switch backplane.

Fabric Module (FM)—A data plane sub-system which usually consist of H/W switching crossbars and is responsible for switching user's traffic through a switching system, from ingress LM to egress LM.

Supervisory Card (SC)—A control plane sub-system that is responsible for management and supervisory control of the entire switching system and runs various embedded S/W applications including routing, signaling, network management, S/W image loader, system health check, system status monitoring applications, e.g. electrical voltage monitor, temperature monitor etc.

Fan Tray (Cooling Sub-System)—An array of FANs responsible for generating cooling for various H/W components and runs under the control of SC(s).

Power Supply Module—An UPS responsible for supplying electrical power for the switching system.

Line Module (LM)—A data plane sub-system which usually consist of Network Processor Units (NPU), Traffic Management H/W Chips, control processor(s) and performs packet forwarding for user's traffic through the switching system.

Figure 6B:
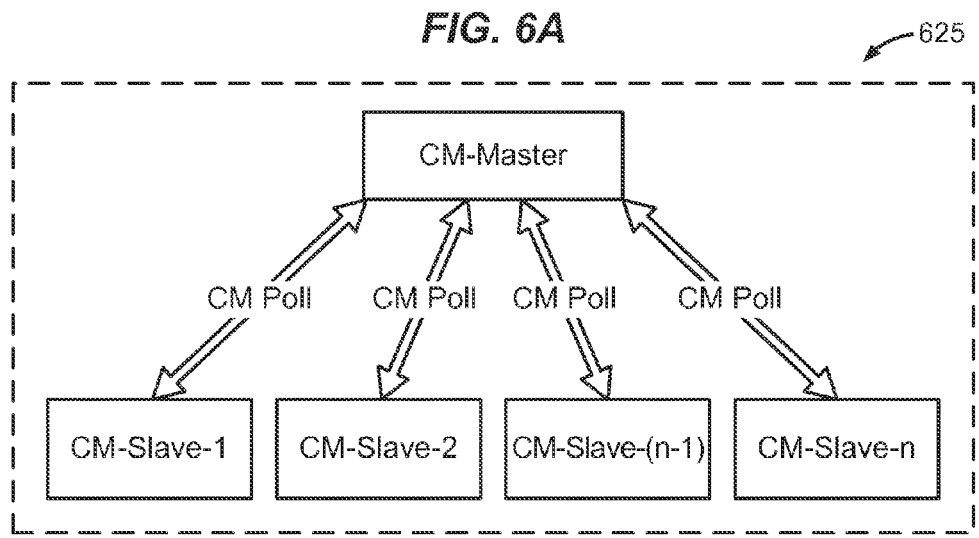
FIG. 6B depicts an exemplary switching system's logical block diagram.

FM-y=>y-th Fabric Module.
SC-y=>y-th Supervisory Card.
FT-y=>y-th Fan Tray (Cooling System).
PS-y=>y-th Power Supply Module.
LM-y=>y-th Line Module FIG. 6B depicts an exemplary switching system's logical block diagram 625 including interactions of CM-Master component with 'n' number of CM-Slave components.

CM-Master—A Congestion Management (CM) S/W component that runs on a Supervisory Card and periodically polls the CM-Salve components that run on every Line Module.

CM-Slave—A Congestion Management (CM) S/W component that runs on every Line Module, and is responsible for monitoring and detecting congestion status of packet processing resources inside the Line module.

CM Poll—CM-Master periodically sends a poll request message to fetch the monitored and calculated congestion level from each CM-Slave on every Line Module, in the switching system.

Figure 6C:
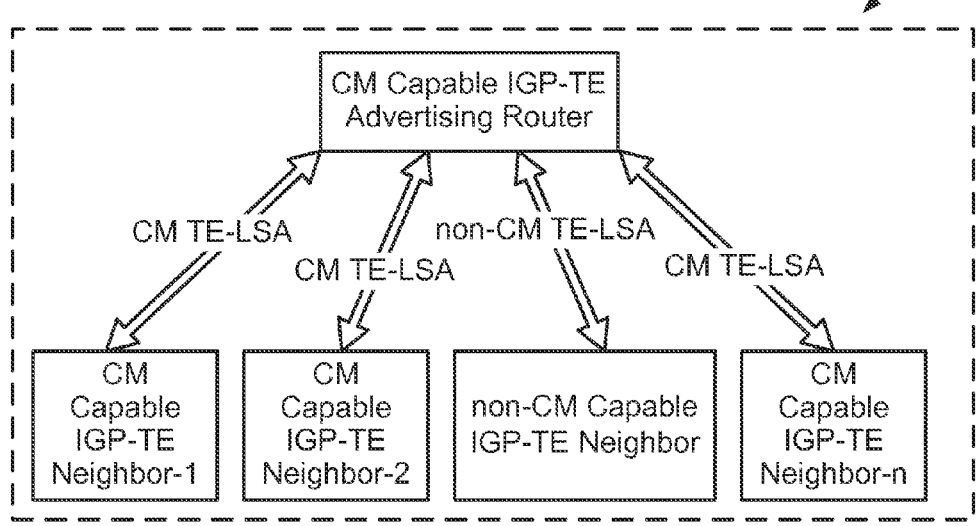
FIG. 6C depicts an exemplary logical block diagram.

FIG. 6C depicts an exemplary logical block diagram 650 showing interactions of IGP-TE (OSPF-TE or ISIS-TE) protocol in the local switching node with 'n' number of IGP-TE speaking neighbor switches, such as IGP-TE LSA advertising including congestion management information.

CM-IGP-TE-Router—Local router/switch advertising Congestion Management (CM) information via IGP-TE extended LSA.

CM-IGP-TE-Neighbor—Neighbor router/switch receiving Congestion Management information via extended IGP-TE LSA (OPSF or IS-IS).

Further, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

At least a portion of the methods, sequences and/or algorithms described in connection with the embodiments disclosed herein may be embodied directly in hardware, in a software module executed by a processor (such as a special-purpose processor), or in a combination of the two. In an example, a processor includes multiple discrete hardware components. A software module may reside in a random access (RAM) memory, a flash memory, a read only memory (ROM), an electrically erasable programmable read only memory (EEPROM), an erasable programmable read only memory (EPROM), a register, a hard disk, a removable disk, a compact disk read only memory (CD-ROM), and/or any other form of storage medium known in the art. An exemplary storage medium can be coupled to the processor such that the processor can read information from, and write information to, the storage medium. In an alternative, the storage medium may be integral with the processor.

Further, many embodiments are described in terms of sequences of actions to be performed by, for example, elements of a computing device. Various actions described herein can be performed by a specific circuit (e.g., an application specific integrated circuit (ASIC)), by program instructions being executed by one or more processors, or by a combination of both. Additionally, the actions described herein can be embodied entirely within any form of computer readable storage medium storing a corresponding set of computer instructions that upon execution would cause an associated processor (such as a special-purpose processor) to perform the functionality described herein. Alternatively, at least a part of the methods described herein can be implemented by a state machine that has no stored program instructions. Thus, the various aspects of the invention may be embodied in a number of different forms, all of which have been contemplated to be within the scope of the claimed subject matter. In addition, for each of the embodiments described herein, a corresponding circuit of any such embodiments may be described herein as, for example, "logic configured to" perform a described action.

An embodiment of the invention can include a computer readable media embodying a method described herein. Accordingly, the invention is not limited to illustrated examples and any means for performing the functionality described herein are included in embodiments of the invention.

The disclosed devices and methods can be designed and can be configured into a computer-executable file that is in a Graphic Database System Two (GDSII) compatible format, an Open Artwork System Interchange Standard (OASIS) compatible format, and/or a GERBER (e.g., RS-274D, RS-274X, etc.) compatible format, which are stored on a non-transitory (i.e., a non-transient) computer-readable media. The file can be provided to a fabrication handler who fabricates with a lithographic device, based on the file, an integrated device. In an example, the integrated device is on a semiconductor wafer. The semiconductor wafer can be cut into a semiconductor die and packaged into a semiconductor chip. The semiconductor chip can be employed in a device described herein (e.g., a mobile device).

Embodiments can include a non-transitory (i.e., a non-transient) machine-readable media and/or a non-transitory (i.e., a non-transient) computer-readable media embodying instructions which, when executed by a processor (such as a special-purpose processor), transform a processor and any other cooperating devices into a machine configured to perform at least a part of a function described hereby and/or transform a processor and any other cooperating devices into at least a part of the apparatus described hereby.

Nothing stated or illustrated herein is intended to cause a dedication of any component, step, feature, object, benefit, advantage, or equivalent to the public, regardless of whether the component, step, feature, object, benefit, advantage, or the equivalent is recited in the claims.

While this disclosure describes exemplary embodiments of the invention, it should be noted that various changes and modifications could be made herein without departing from the scope of the invention as defined by the appended claims.

What is claimed is:

1. A method for mitigating congestion in a multi protocol label switching (MPLS) network, comprising:
    monitoring, at a network element, a traffic drop count due to traffic queue overflow on at least one of a traffic queue coupled to a link and a network interface coupled to the link;
    converting the traffic drop count to a normalized congestion indicator for the at least one of the traffic queue and the network interface; and
    optimizing, based on the normalized congestion indicator, a route of a label switched path in the MPLS network so the route avoids the link.

2. The method of claim 1, further comprising advertising the normalized congestion indicator to a second network element with a type length value element.

3. The method of claim 2, further comprising, at the second network element:
    configuring a point of local repair node to monitor a service quality of the label switched path by checking for the advertised normalized congestion indicator;
    comparing the advertised normalized congestion indicator to a threshold value; and
    triggering, if the advertised normalized congestion indicator degrades beyond the threshold value, a protection switchover of the label switched path to a back-up route.

4. The method of claim 1, further comprising:
    estimating a time delay required to drain the queued traffic, based on an average queue length and a packet scheduling rate; and
    advertising the time delay to a second network element with a type length value element.

5. The method of claim 1, wherein the optimizing includes rerouting the route using a resource reservation protocol make-before-break procedure or a generalized multiprotocol label switching resource reservation protocol tunnel rerouting.

6. An apparatus configured to mitigate congestion in a multi protocol label switching (MPLS) network, comprising:
    means for monitoring, at a network element, a traffic drop count due to traffic queue overflow on at least one of a traffic queue coupled to a link and a network interface coupled to the link;
    means for converting the traffic drop count to a normalized congestion indicator for the at least one of the traffic queue and the network interface; and
    means for optimizing, based on the normalized congestion indicator, a route of a label switched path in the MPLS network so the route avoids the link.

7. The apparatus of claim 6, further comprising means for advertising the normalized congestion indicator to a second network element with a type length value element.

8. The apparatus of claim 6, further comprising:
    means for estimating a time delay required to drain the queued traffic, based on an average queue length and a packet scheduling rate; and
    means for advertising the time delay to a second network element with a type length value element.

9. The apparatus of claim 6, wherein the means for optimizing includes means for rerouting the route using a resource reservation protocol make-before-break procedure or a generalized multiprotocol label switching resource reservation protocol tunnel rerouting.

10. The apparatus of claim 6, wherein the means for optimizing is integrated with at least one of an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, and an aggregation platform extension device, and a network element configured to change Operations, Administration, and Maintenance (OAM) attributes.

11. An apparatus configured to mitigate congestion in a multi protocol label switching (MPLS) network, comprising a processor configured to:
    monitor, at a network element, a traffic drop count due to traffic queue overflow on at least one of a traffic queue coupled to a link and a network interface coupled to the link;
    convert the traffic drop count to a normalized congestion indicator for the at least one of the traffic queue and the network interface; and
    optimize, based on the normalized congestion indicator, a route of a label switched path in the MPLS network so the route avoids the link.

12. The apparatus of claim 11, wherein the processor is further configured to advertise the normalized congestion indicator to a second network element with a type length value element.

13. The apparatus of claim 11, wherein the processor is further configured to:
    calculate a time delay required to drain the queued traffic, based on an average queue length and a packet scheduling rate; and
    advertise the time delay to a second network element with a type length value element.

14. The apparatus of claim 11, wherein the optimizing includes rerouting the route using a resource reservation protocol make-before-break procedure or a generalized multiprotocol label switching resource reservation protocol tunnel rerouting.

15. The apparatus of claim 11, wherein the processor is integrated with at least one of an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, and an aggregation platform extension device, and a network element configured to change Operations, Administration, and Maintenance (OAM) attributes.

16. A non-transitory computer-readable medium, comprising:
    instructions stored thereon that, if executed by a processor, cause the processor to:
        monitor, at a network element, a traffic drop count due to traffic queue overflow on at least one of a traffic queue coupled to a link and a network interface coupled to the link;
        convert the traffic drop count to a normalized congestion indicator for the at least one of the traffic queue and the network interface; and
        optimize, based on the normalized congestion indicator, a route of a label switched path in the MPLS network so the route avoids the link.

17. The non-transitory computer-readable medium of claim 16, wherein the instructions, if executed by a processor, further cause the processor to advertise the normalized congestion indicator to a second network element with a type length value element.

18. The non-transitory computer-readable medium of claim 16, wherein the instructions, if executed by a processor, further cause the processor to:
- calculate a time delay required to drain the queued traffic, based on an average queue length and a packet scheduling rate; and
- advertise the time delay to a second network element with a type length value element.

19. The non-transitory computer-readable medium of claim 16, wherein the optimizing includes rerouting the route using a resource reservation protocol make-before-break procedure or a generalized multiprotocol label switching resource reservation protocol tunnel rerouting.

20. The non-transitory computer-readable medium of claim 16, wherein the processor is integrated with at least one of an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, and an aggregation platform extension device, and a network element configured to change Operations, Administration, and Maintenance (OAM) attributes.

* * * * *